(12) United States Patent
Matsushita et al.

(10) Patent No.: US 7,133,556 B1
(45) Date of Patent: Nov. 7, 2006

(54) CHARACTER RECOGNITION DEVICE AND METHOD FOR DETECTING ERRONEOUSLY READ CHARACTERS, AND COMPUTER READABLE MEDIUM TO IMPLEMENT CHARACTER RECOGNITION

(75) Inventors: Tsutomu Matsushita, Matsudo (JP); Norikazu Shiiya, Inba (JP); Toshikazu Hori, Yokohama (JP); Kouji Yoshimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 508 days.

(21) Appl. No.: 09/661,428

(22) Filed: Sep. 13, 2000

(30) Foreign Application Priority Data

Sep. 16, 1999 (JP) ................................. 11-261968

(51) Int. Cl.
*G06K 9/00* (2006.01)
(52) U.S. Cl. .................... 382/181; 382/185; 382/186; 382/187
(58) Field of Classification Search ........ 382/181–182, 382/195–198, 321, 322, 323, 324
See application file for complete search history.

(56) References Cited

U.S. PATENT DOCUMENTS 5,228,100 A * 7/1993 Takeda et al. .............. 382/175
5,557,789 A * 9/1996 Mase et al. .................... 707/1
5,727,130 A * 3/1998 Hung ........................... 706/13
6,320,983 B1 * 11/2001 Matsuno et al. ............ 382/186
6,341,176 B1 * 1/2002 Shirasaki et al. ........... 382/229
6,345,119 B1 * 2/2002 Hotta et al. ................. 382/225
6,697,524 B1 * 2/2004 Arai et al. .................. 382/187

FOREIGN PATENT DOCUMENTS

JP  07-114620  5/1995

* cited by examiner

*Primary Examiner*—Jingge Wu
*Assistant Examiner*—Brian Le
(74) *Attorney, Agent, or Firm*—Staas & Halsey LLP

(57) ABSTRACT

A character recognition device to recognize characters in a text image read by an image scanner having a first recognition device to recognize the characters in the text image using a first character recognition method and a second recognition device to recognize the characters in the text image using a second character recognition method different from the first character recognition method. An extraction device extracts locations of recognized characters in the text image wherein the recognition results of the first recognition device do not coincide with the recognition results of the second recognition device. An output device outputs character recognition results designating the non-coinciding locations extracted by the extraction device.

10 Claims, 11 Drawing Sheets

| IMAGE DATA | RECOGNITION RESULTS |
|---|---|
| THE PROCESS STARTS FROM A REQUEST TO CARRY OUT (1) MECHANICALLY [THIS CHARACTER IS PRINTED INCORRECTLY] A HUMAN ABILITY WHEN THE PATTERN RECOGNITION PROCESS DISTINGUISHES BETWEEN CHARACTERS WHEN THEY ARE WRITTEN AND CHARACTERS WHEN THEY ARE READ ALOUD. A GREAT DEAL OF RESEARCH HAS STOPPED AT THIS POINT. CHARACTER RECOGNITION IN PARTICULAR HAS AN EXTREMELY LONG HISTORY AND IS A FIELD THAT HAS MADE GREAT (2) ADVANCES [THIS PRINTED CHARACTER IS PRINTED INCORRECTLY]. (3) WRITTEN WORDS [HERE THE CHARACTERS ARE PRINTED CORRECTLY] ARE CLOSE TO US IN OUR EVERYDAY LIVES; THEY HAVE OUTSTANDING RECORDING CHARACTERISTICS AND GOOD REPRODUCIBILITY. THEY GIVE LIFE TO HUMAN INTUITION AND PROVIDE SUITABLE CHARACTERISTICS AS THE RAW MATERIALS FOR PATTERN RECOGNITION RESEARCH THAT INVOLVES FITTING A CERTAIN CONCEPT TO A SINGLE WRITTEN WORD. WHAT IS MORE, THE TECHNOLOGY FOR READING THESE WRITTEN WORDS IS A LABOR SAVING DEVICE THAT CARRIES OUT DATA INPUT TO A COMPUTER DIRECTLY WITHOUT USING A KEYBOARD. | THE PROCESS STARTS FROM A REQUEST TO CARRY OUT (1) MECHANICALLY [THIS CHARACTER IS PRINTED INCORRECTLY] A HUMAN ABILITY WHEN THE PATTERN RECOGNITION PROCESS DISTINGUISHES BETWEEN CHARACTERS WHEN THEY ARE WRITTEN AND CHARACTERS WHEN THEY ARE READ ALOUD. A GREAT DEAL OF RESEARCH HAS STOPPED AT THIS POINT. CHARACTER RECOGNITION IN PARTICULAR HAS AN EXTREMELY LONG HISTORY AND IS A FIELD THAT HAS MADE GREAT (2) ADVANCES [THIS CHARACTER IS PRINTED INCORRECTLY]. (3) WRITTEN WORDS [HERE THE CHARACTERS ARE WRITTEN CORRECTLY] ARE CLOSE TO US IN OUR EVERYDAY LIVES; THEY HAVE OUTSTANDING RECORDING CHARACTERISTICS AND GOOD REPRODUCIBILITY. THEY GIVE LIFE TO HUMAN INTUITION AND PROVIDE SUITABLE CHARACTERISTICS AS THE RAW MATERIALS FOR PATTERN RECOGNITION RESEARCH THAT INVOLVES FITTING A CERTAIN CONCEPT TO A SINGLE WRITTEN WORD. WHAT IS MORE, THE TECHNOLOGY FOR READING THESE WRITTEN WORDS IS A LABOR SAVING DEVICE THAT CARRIES OUT DATA INPUT TO A COMPUTER DIRECTLY WITHOUT USING A KEYBOARD. |

FIG. 10

CHARACTER RECOGNITION DEVICE AND METHOD FOR DETECTING ERRONEOUSLY READ CHARACTERS, AND COMPUTER READABLE MEDIUM TO IMPLEMENT CHARACTER RECOGNITION

CROSS REFERENCE TO RELATED APPLICATIONS

This application is based upon and claims priority of Japanese Patent Application No. 11-261968, filed Sep. 16, 1999, the contents being incorporated herein by reference.

BACKGROUND OF THE INVENTION

1. Field of the Invention

The present invention relates to a device for and a method of recognizing characters in text images read by an image scanner, and to a computer readable medium encoded with processing instructions to implement a character recognition method. More particularly, the present invention relates to a character recognition device, a method of character recognition and a computer readable medium encoded with processing instructions to implement a character recognition method which allow a user to efficiently determine erroneously read characters in the character recognition results.

2. Description of the Related Art

There is currently a need for electronic recognition and storage of text to make the work flow in offices more efficient. To perform the electronic recognition and storage of the text, the text is read by an image scanner to convert the text to an electronic form, character recognition is performed and erroneously read characters are revised through manual input.

However, there is currently no technology available that enables character recognition devices to perform completely error-free character recognition. As a result, a cumbersome process is required to detect the erroneously read characters when conventional character recognition operations are carried out. Specifically, text that is to be electronically processed is read with an image scanner, character recognition is performed, erroneously read characters are detected manually, and the text is then further processed electronically by manually inputting revisions to the erroneously read characters. The user detects the erroneously read characters by comparing the text that is to be electronically processed with the text recognition results that have been processed by the character recognition device.

There is currently no support technology available in the prior art to ensure that the types of operations described above to detect erroneously read characters can be carried out efficiently.

A conventional character recognition device uses a method with the highest possible degree of character recognition accuracy when text that is to be electronically processed is read with an image scanner, character recognition is performed and the text is electronically processed by revising the erroneously read characters using manual input.

Japanese Unexamined Patent Publication No. H7-114620 discloses a character recognition device which performs character recognition with a high recognition rate. More particularly, Japanese Unexamined Patent Publication No. H7-114620 discloses a character recognition device and method wherein handwritten characters input using a stylus pen or the like are recognized using multiple character recognition programs respectively using different recognition methods. The characters having the highest evaluation value out of those characters recognized by the character recognition program are determined to be "recognized characters". The multiple recognition character candidates are determined in the order of highest evaluation value and passed on to an application program.

In accordance with the conventional character recognition device, when text that is not electronically processed is read by an image scanner and character recognition of the text is performed, the user then detects the erroneously read characters by comparing the text prior to electronic processing with the recognition results after electronic processing, and the text is then electronically processed by revising the erroneously read characters.

However, the above-described conventional character recognition technology results in problems in that the operations required are extremely burdensome. In particular, the user has to search for the erroneously read characters by visually comparing each character of the text to be electronically processed with each character of the text recognition results recognized by the character recognition device.

SUMMARY OF THE INVENTION

It is an object of the present invention to provide a character recognition device and method which overcomes the above-described problems of the conventional character recognition devices.

It is another object of the present invention to provide a character recognition device and method of character recognition for processing text images read by an image scanner which recognizes characters in a text image in a manner that a user can efficiently determine erroneously read characters in the character recognition results using a plurality of character recognition devices or methods.

It is another object of the present invention to provide a computer readable storage medium encoded with processing instructions to implement a character recognition method for recognizing characters in a text image.

Objects and advantages of the present invention are achieved with a character recognition device to recognize characters in a text image read by an image scanner, comprising a multiple recognition device to separately perform character recognition of the text image using respective recognition methods; an extraction device to extract locations of non-coinciding results in the characters recognized by the respective recognition methods; and an output device to designate the non-coinciding locations extracted by the extraction device and to output character recognition results for the text image.

Objects and advantages of the present invention are achieved in accordance with embodiments of the present invention with a character recognition device to recognize characters in a text image read by an image scanner, comprising a first recognition device to recognize the characters in the text image using a first character recognition method; a second recognition device to recognize the characters in the text image using a second character recognition method different from the first character recognition method; an extraction device to extract locations of recognized characters in the text image wherein the recognition results of the first recognition device do not coincide with the recognition results of the second recognition device; and an output device to output character recognition results designating the non-coinciding locations extracted by the extraction device.

In accordance with the present invention, the output device contrasts the text image and the character recognition results.

In accordance with the present invention, the character recognition device further comprises a display device having a display screen to display character recognition results, wherein the output device contrasts the text image and the character recognition results while displaying the character recognition results on the display screen, and displays a cursor in a display area of the character recognition results while displaying the text image in a format that designates the location of the text image coordinated at the position of the cursor.

In accordance with the present invention, the output device outputs a symbol or a blank to display locations of character recognition results that do not coincide instead of the recognized characters.

In accordance with the present invention, the output device outputs the recognized characters with a high evaluation value for the non-coinciding locations that have the same number of recognized characters in an output format that is different from the output format of the non-coinciding locations.

In accordance with the present invention, the output device outputs the recognized characters of the non-coinciding locations selected using the prescribed standards for the non-coincident locations with a different number of recognized characters in a format that is different from the output format for the non-coinciding locations.

In accordance with the present invention, the output device outputs in a format indicating that the recognition results coincide but have a low recognition reliability.

Objects and advantages of the present invention are achieved in accordance with embodiments of the present invention with a character recognition method to recognize characters in a text image read by an image scanner, comprising recognizing the characters in the text image using a first recognition method; recognizing the characters in the text image using a second recognition method different from the first recognition method; extracting non-coinciding locations in the recognition results of the character recognition using the first recognition method and the recognition results of the character recognition using the second recognition method; and designating the extracted non-coinciding locations and outputting the character recognition results of the characters in the text image.

Objects and advantages of the present invention are achieved in accordance with embodiments of the present invention with a computer readable medium encoded with processing instructions for implementing a character recognition method of recognizing characters in text images read by an image scanner, the character recognition method comprising recognizing characters in the text image using a first recognition method; recognizing characters in the text image using a second recognition method different from the first recognition method; extracting non-coinciding locations in the recognition results of the recognition using the first recognition method and the recognition results of the recognition using the second recognition method; and designating extracted non-coinciding locations and outputting the recognition results of the characters in the text images.

In accordance with the present invention, the recognition results are output to a computer.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above and other objects and advantages of the present invention will become apparent and more readily appreciated from the following description of the preferred embodiments, taken in conjunction with the accompanying drawings, of which:

FIG. 10 is an explanatory diagram for the operation of the output program in accordance with embodiments of the present invention.

DESCRIPTION OF THE PREFERRED EMBODIMENTS

Figure 1:
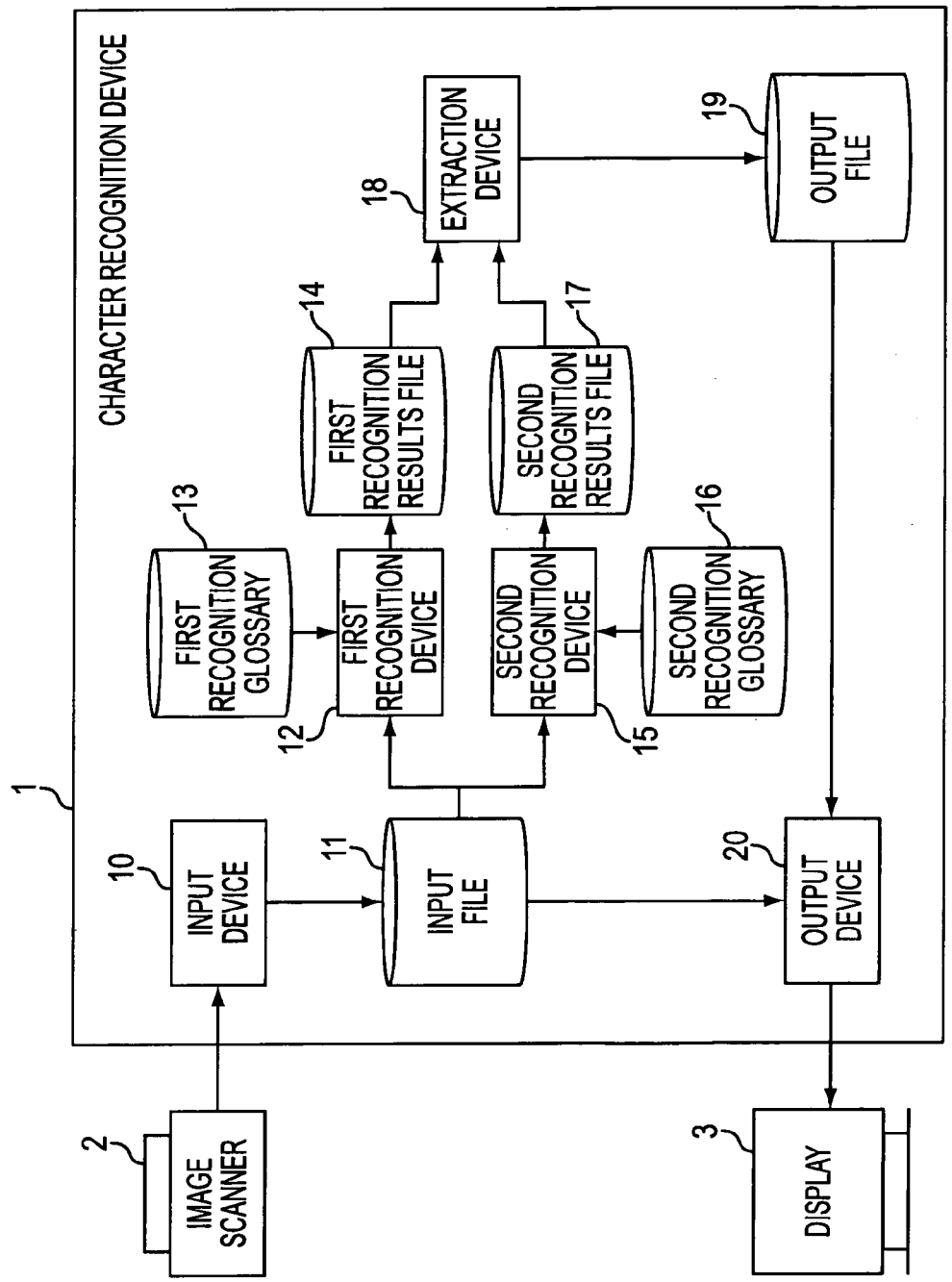
FIG. 1 is a block diagram of a character recognition device in accordance with embodiments of the present invention.

Reference will now be made to the present preferred embodiments of the invention, examples of which are illustrated in the accompanying drawings, wherein like reference numerals refer to like elements throughout.

FIG. 1 is a block diagram of a character recognition device in accordance with embodiments of the present invention. As shown in FIG. 1, a character recognition device 1 receives the output of an image scanner 2, and a display 3 displays an output of the character recognition device 1.

The character recognition device 1 includes an input device 10, an input file 11, a first recognition device 12, a first recognition glossary 13, a first recognition results file 14, a second recognition device 15, a second recognition glossary 16, a second recognition results file 17, an extraction device 18, an output file 19 and an output device 20.

The text images read by the image scanner 2 are input to the input device 10. The input file 11 stores the text images which are input by the input device 10 as, for example, binary text images.

The first recognition device 12 recognizes characters in the text images that are input by the input device 10 according to a prescribed recognition method. The first recognition glossary 13 controls the glossary data required for the recognition processing performed by the first recognition device 12. The first recognition results file 14 stores the recognition results of the first recognition device 12.

The second recognition device 15 recognizes the characters in the text images that are input by the input device 10 according to another recognition method different from the recognition method used by the first recognition device 12. The second recognition glossary 16 controls the glossary data required for the recognition processing performed by the second recognition device 15. The second recognition results file 17 stores the recognition results of the second recognition device 15.

The extraction device 18 extracts the non-coinciding locations in the recognition results of the first recognition device 12 and the recognition results of the second recognition device 15.

The output file 19 records the non-coinciding locations that are extracted by the extraction device 18 while storing the recognition results of the first and second recognition devices 12 and 15. The output device 20 designates the non-coinciding locations extracted by the extraction device 18, while outputting the recognition results for the characters in the text images that have been input by the input device 10.

In accordance with embodiments of the present invention, the operation of the character recognition device 1 is preferably controlled by a character recognition program, a circuit, or the like. For example, a character recognition program is stored in a computer readable medium encoded with processing instructions for implementing character recognition. For example, the program may be stored on a floppy disk or the like, on a server, or other types of disks, and is installed in memory in the character recognition device 1.

In operation of the character recognition device in accordance with embodiments of the present invention, the first recognition device 12 recognizes the characters in the text images that are input by the input device 10 according to a first prescribed type of character recognition method. The second recognition device 15 recognizes the characters in the text images input by the input device 10 using a second character recognition method different from the recognition method used by the first recognition 12.

The extraction device 18 receives the recognition results and extracts the non-coinciding locations in the recognition results of the first recognition device 12 and the recognition results of the second recognition device 15. The extraction results are received and the output device 20 designates the non-coinciding locations that are extracted by the extraction device 18. At the same time, the recognition results of the characters in the text images input by the input device 10 are output.

In accordance with embodiments of the present invention, the output device 20 contrasts the input text images and the recognition results, and outputs the recognition results by displaying the recognition results on the display screen 3. Furthermore, a cursor is displayed on the display area of the recognition results such that the text images are displayed in a format that clearly indicates the location of the text images coordinated to the cursor position.

Moreover, in accordance with embodiments of the present invention, the output device 20 provides an output in a format that makes it possible to understand that while the recognition results do coincide, the reliability of the recognition process itself is low.

Thus, in accordance with embodiments of the present invention, when recognizing characters in the text images, the character recognition device 1 uses multiple recognition devices that respectively use different recognition methods for processing the text images read by the image scanner 2. The non-coinciding locations of the recognition results of the multiple recognition devices are extracted and the non-coinciding locations are designated while at the same time, the character recognition results are output. In accordance with the present invention, the user can instantly see the erroneously read characters in the recognition results, thus making it possible to efficiently check such erroneously read characters.

Figure 2:
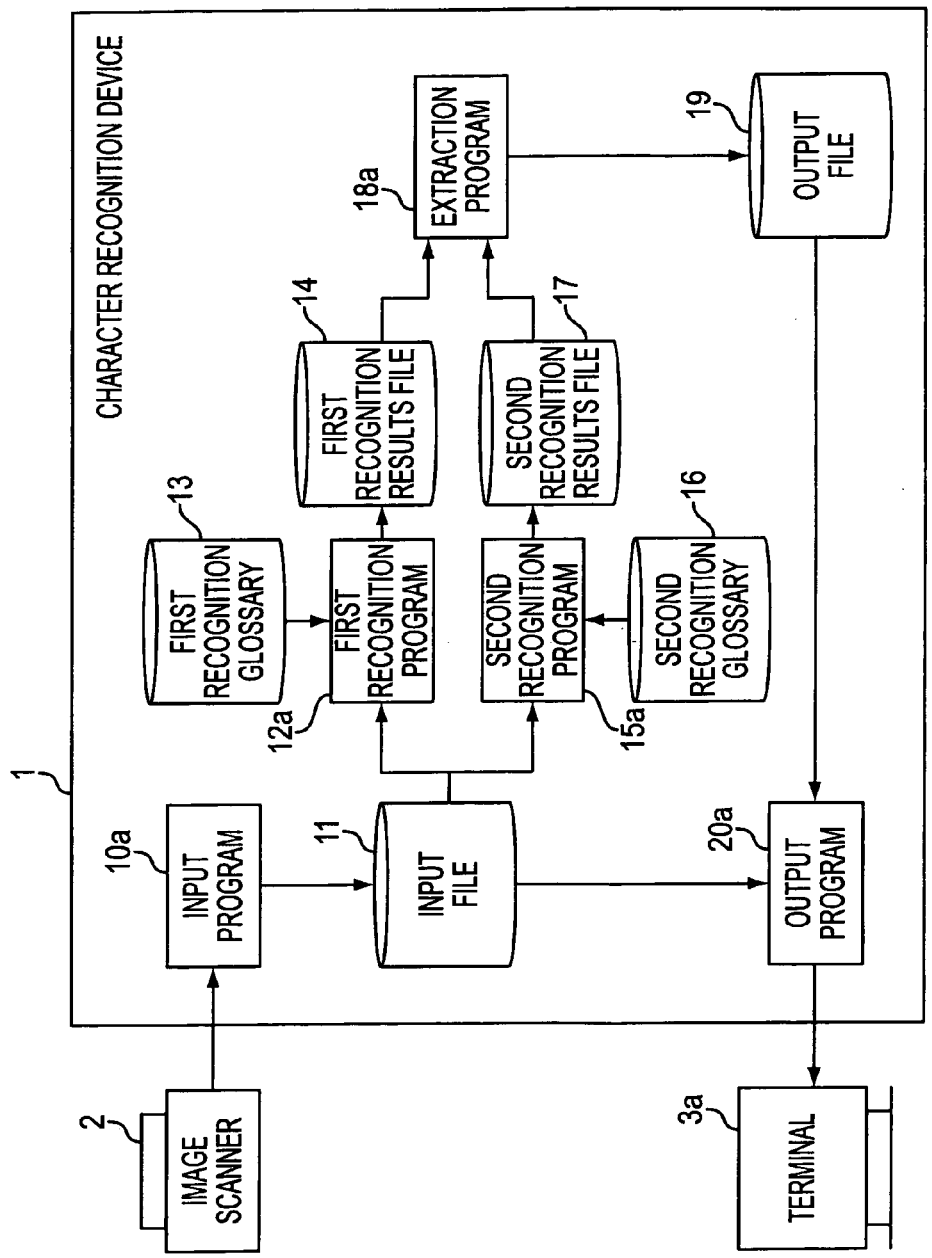
FIG. 2 is a block diagram of a character recognition device in accordance with embodiments of the present invention.

As shown in FIG. 2, a terminal 3*a* including a display, a mouse and other input devices, is used for communication with the user. An input program 10*a* inputs text images read by the image scanner 2, in a manner similar to the input device 10 shown in FIG. 1. A first recognition program 12*a*, a second recognition program 15*a*, an extraction program 18*a* and an output program 20*a* operate in the same manner as the first recognition device 12, the second recognition device 15, the extraction device 18, and the output device 20, respectively, shown in FIG. 1.

In accordance with embodiments of the present invention, the input program 10*a*, the first recognition program 12*a*, the second recognition program 15*a*, the extraction program 18*a* and the output program 20*a* are installed via a floppy disk, a circuit or the like.

In accordance with preferred embodiments of the present invention, the character recognition device 1 preferably processes text in the form of electronically printed characters, such as characters printed by a typewriter or laser printer, and the text is read by the image scanner 2. Character recognition is performed by the first recognition program 12*a* and the second recognition program 15*a*. The character recognition device 1 designates the locations where the results of the two recognition programs 12*a* and 15*a* do not coincide. At the same time, processing is performed so that the recognition results are displayed on the display screen of the terminal 3*a*, and electronic processing of the text that has not been electronically processed can be efficiently performed.

The first recognition program 12*a* and the second recognition program 15*a*, which control character recognition processing, respectively perform the character recognition according to different recognition algorithms. The respective recognition algorithms follow the same pattern; however, processing is performed so that the character recognition is executed according to the different recognition methods. Thus, character recognition is performed according to respective recognition methods that differ according to the specific protocols at the product packaging level.

The first recognition program 12*a* references the first recognition glossary 13, and the second recognition program 15*a* references the second recognition glossary 16. However, the first recognition glossary 13 and the second recognition glossary 16 are used conjointly by using a recognition method that uses the first recognition program 12*a* and a recognition method that uses the second recognition program 15*a*.

In accordance with embodiments of the present invention, various well-known recognition algorithms for printed characters and characteristic extraction can be used, such as an expansion cell characteristic method, a weighted direction histogram method and an outer contour direction contribution characteristic method. Moreover, various well-known methods for identification processing can be used, such as the city block distance, Euclidean distance, linear identification function, the partial space method, the KNN method and the base identification method.

In accordance with the present invention, when the character recognition device 1 processes the text printed in type, the first recognition program 12a and the second recognition program 15a perform character recognition using separate recognition algorithms that are preferably selected from the above recognition algorithms.

Figure 3:
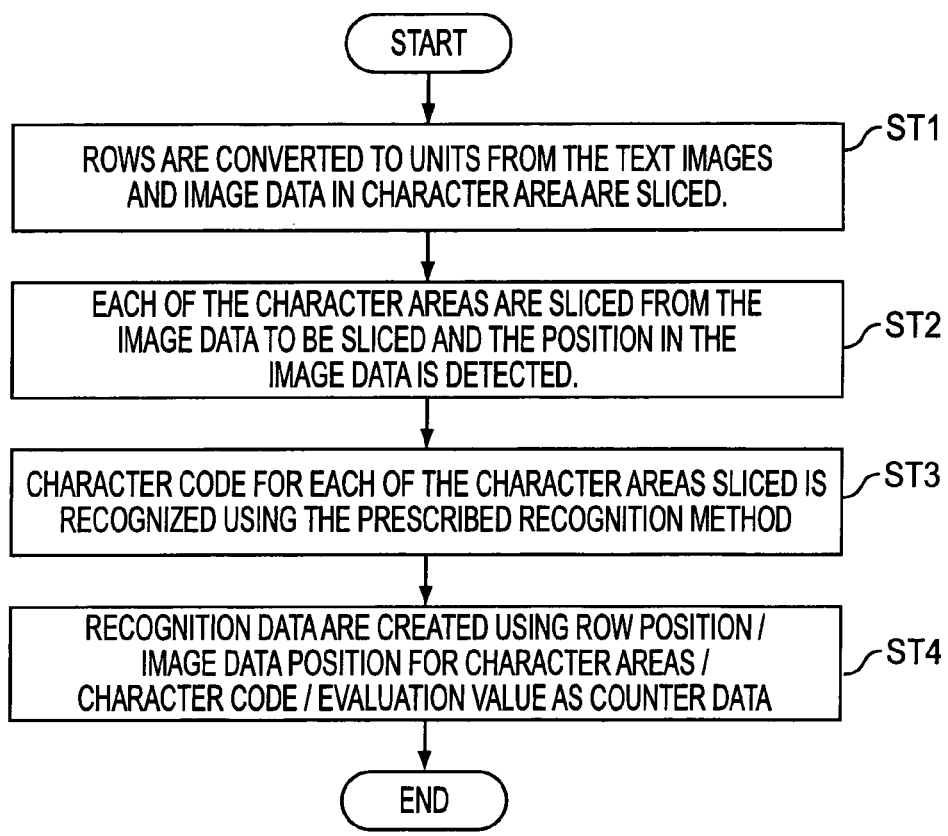
FIG. 3 is a flow chart of an operational process for performing character recognition in accordance with embodiments of the present invention.
Figure 4:
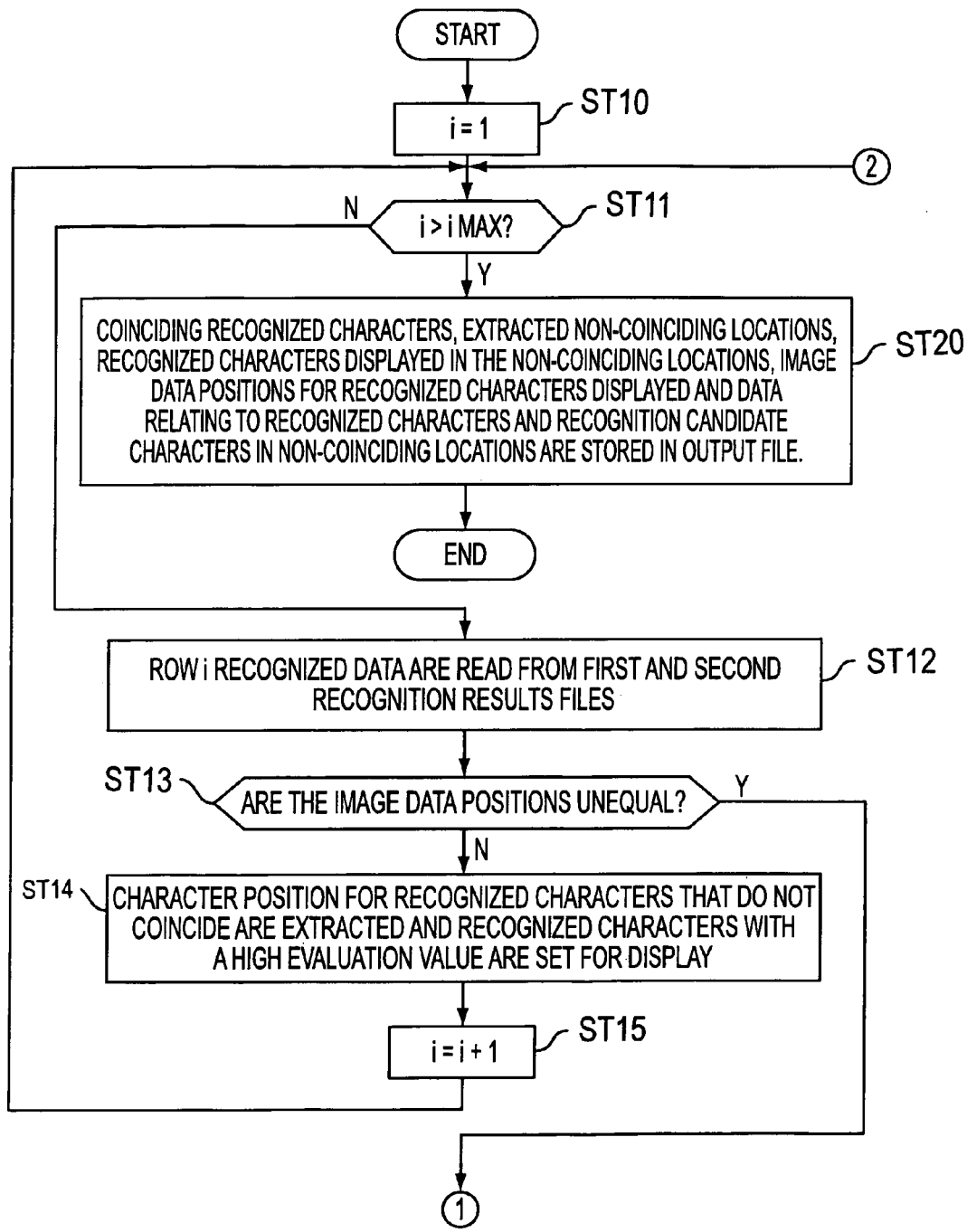
FIG. 4 is a flow chart of an operational process for performing extraction of non-coinciding characters in accordance with embodiments of the present invention.
Figure 5:
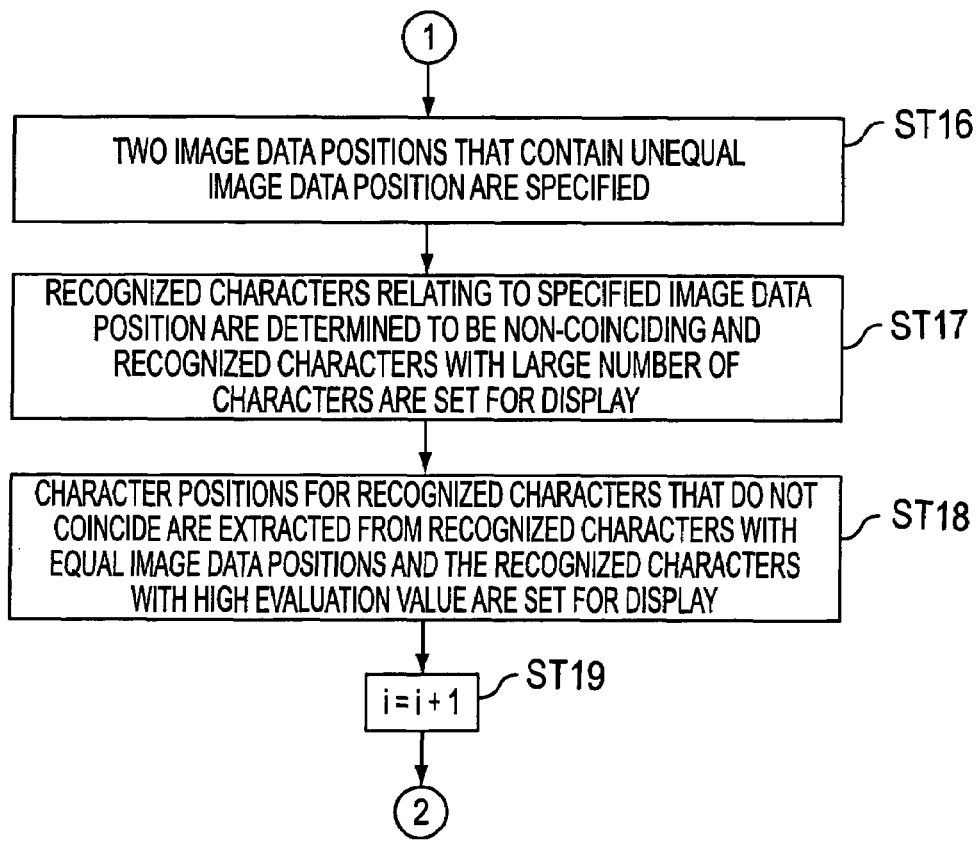
FIG. 5 is a flow chart of an operational process for performing extraction of non-coinciding characters in accordance with embodiments of the present invention.
Figure 6:
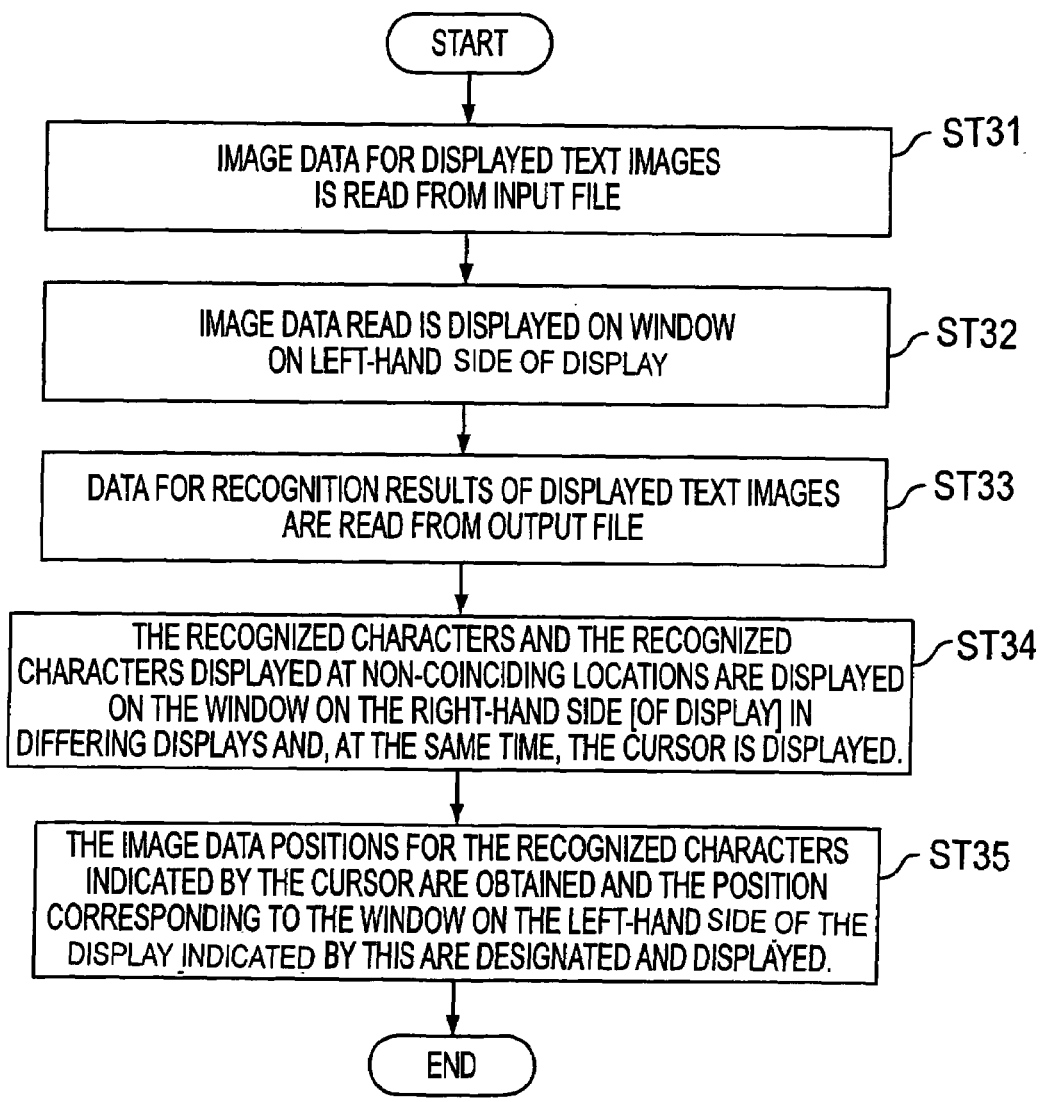
FIG. 6 is a flow chart of an operational process for outputting recognition results in accordance with embodiments of the present invention.

FIG. 3 is a flow chart illustrating an operational process for performing character recognition by execution of the first and second recognition programs 12a and 15a in accordance with embodiments of the invention. FIG. 4 and FIG. 5 are flow charts illustrating an operational process for performing extraction of non-coinciding characters by execution of extraction program 18a in accordance with embodiments of the present invention. FIG. 6 is a flow chart illustrating an operational process for performing output of recognition results by execution of the output program 20a in accordance with embodiments of the present invention.

A detailed explanation of the operational process performed by the character recognition device 1 by execution of the first and second recognition programs 12a, 15a, extraction program 18a and output program 20a in accordance with the present invention will now be described below. In the description below, it is assumed that the text images to be processed that are input by the input program 10a are typed or written horizontally.

The operational process performed by the first and second recognition programs 12a and 15a according to the flow chart shown in FIG. 3 will be described first below.

As shown in FIG. 3, when the first and second recognition programs 12a and 15a are assigned text images stored in the input file 11 and a processing request is issued, firstly, in step ST1, the text images to be processed are read out from the input file 11, the rows of text images are converted to units according to a well-known slicing algorithm, and the image data in the character areas are sliced from the text images read out.

Figure 7A:
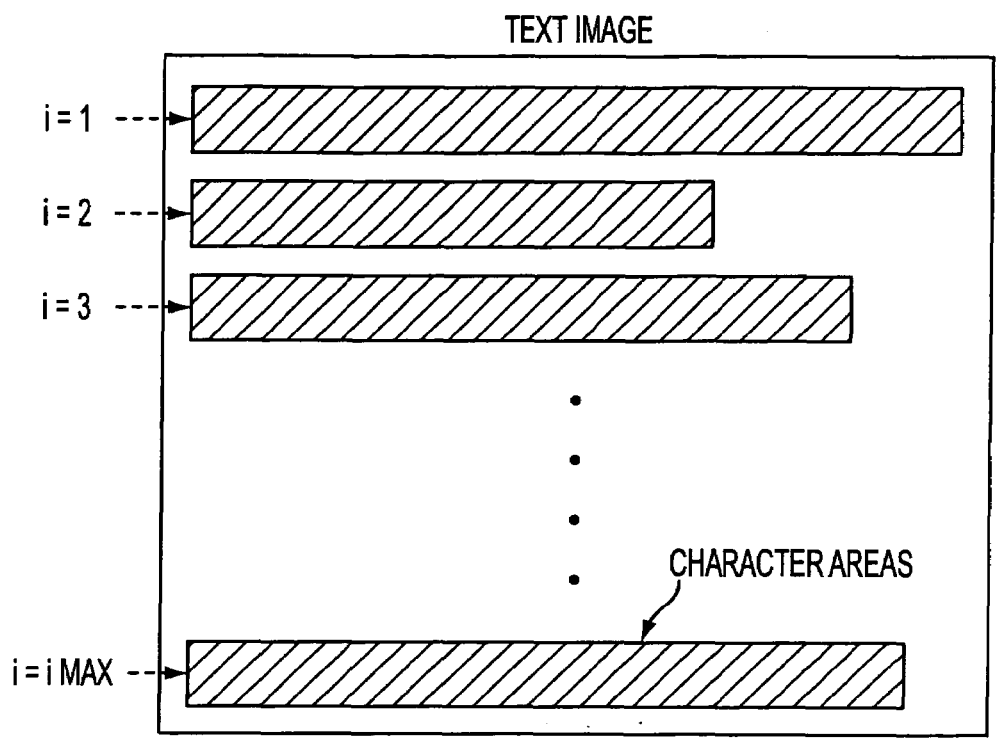
FIGS. 7A and 7B are explanatory diagrams for the operation of the recognition program in accordance with embodiments of the present invention.

As shown in FIG. 7A, which is an explanatory diagram of processing performed by a recognition program, the rows i(i=1–i max) of the text image are converted into units corresponding to the horizontally written text images, and the image data in the character areas are sliced from the text images. In accordance with the present invention, when the text images to be processed are written vertically, the columns of text images are converted to units and the image data in the character areas are sliced from the text images. Further, when the input program 10a reads the text images according to whether the text images are written horizontally or vertically, this information is obtained from the user, the application program, or the like.

Next, in step ST2, the character areas for each of the characters in the text images are sliced from the image data in the row units and the position in the image data is detected according to the well-known slicing algorithm.

Figure 7B:
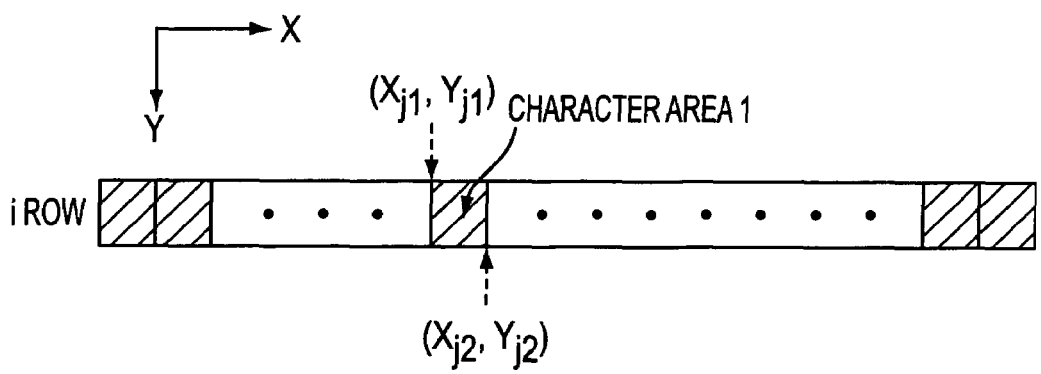

As shown in FIG. 7B, the character areas of each of the characters defined in a square format are sliced from the image data in the character areas sliced for the row units. For example, the position in the text image data for each of the character areas is detected by detecting the left upper ranking position coordinate $(x_{j1}, y_{j1})$ and the right lower ranking coordinate $(x_{j2}, Y_{j2})$ in the image data in each of the character areas.

Next, in step ST3, the character codes for each of the character areas sliced in the above-described manner are recognized using a prescribed recognition method. At this time, the characters with a first order evaluation value (similarity) are used as the recognition results (recognized characters). However, the character codes are coordinated to the recognized characters and the prescribed number of characters with the high evaluation value are catalogued as recognition candidate characters. As described previously, the first recognition program 12a and the second recognition program 15a execute character recognition using different recognition methods.

Finally, in step ST4, recognition data are created using the image data position, a character code for the recognition characters and the recognition candidate characters linked to these, an evaluation value in the row position for recognized characters and the recognition candidate characters linked to these, and character areas as counter data for each character recognition result.

Thus, the recognition data created by the first recognition program 12a (row position for each recognition character, image data position in the character areas, character code, evaluation value) are stored in the first recognition results files 14. The recognition data created by the second recognition program 15a (row position for each of the recognized characters, image data position in the character areas, character code, evaluation value) are stored in the second recognition results file 17.

The operational process for performing extraction of non-coinciding characters controlled by the extraction program 18a, as shown in the flow charts in FIGS. 4 and 5, will now be described below.

Firstly, in step ST10, when the extraction program 18a operates to store recognition data in the first and second recognition results files 14 and 17, the variable i indicating the row number is initialized to "1".

Next, in step ST11, it is determined whether or not the variable i exceeds a maximum value i max (shown in FIG. 7A). When it is determined that the variable i does not exceed the maximum value i max, the operational process continues in step ST 12 where the recognition data relating to row i created by the first recognition program 12a is read, and, at the same time, recognition data relating to row i created by the second recognition program 15a is read. Further, at this point, no readout is necessary for the data related to the recognition candidate characters.

Next, in step ST13, it is determined whether or not there are any items for which: $[x_{j1}=x_{j1}]$ from the list for the coordinate $x_{j1}$ (j=1~j max) that has a left upper ranking position coordinate $(x_{j1}, y_{j1})$ in each of the character areas read from the first recognition results file 14 and from the list for the coordinate $x_{j1}'$ (j=1~j max') that has a left upper ranking coordinate $(X_{j1}', y_{j1}')$ in each of the character areas read from the second recognition results file 17.

When it is decided that $[x_{j1}=x_{j1}']$ is established for all of the coordinates $x_{j1}$, $x_{j1}'$ in step ST13, the operational process continues in step ST14. More specifically, when it is determined that the number of recognition characters in row i recognized by the first recognition program 12a is equal to the number of recognition characters in row i recognized by the second recognition program 15a, the operational process proceeds to step ST14. The character position for the recognition characters that do not coincide is detected by determining whether or not the recognized characters recognized by the first recognition program 12a and the recognized characters recognized by the second recognition program 15a coincide. At the same time, the recognized characters with the high evaluation value are set for processing by comparing the evaluated values with two recognized characters that do not coincide.

Figure 8:
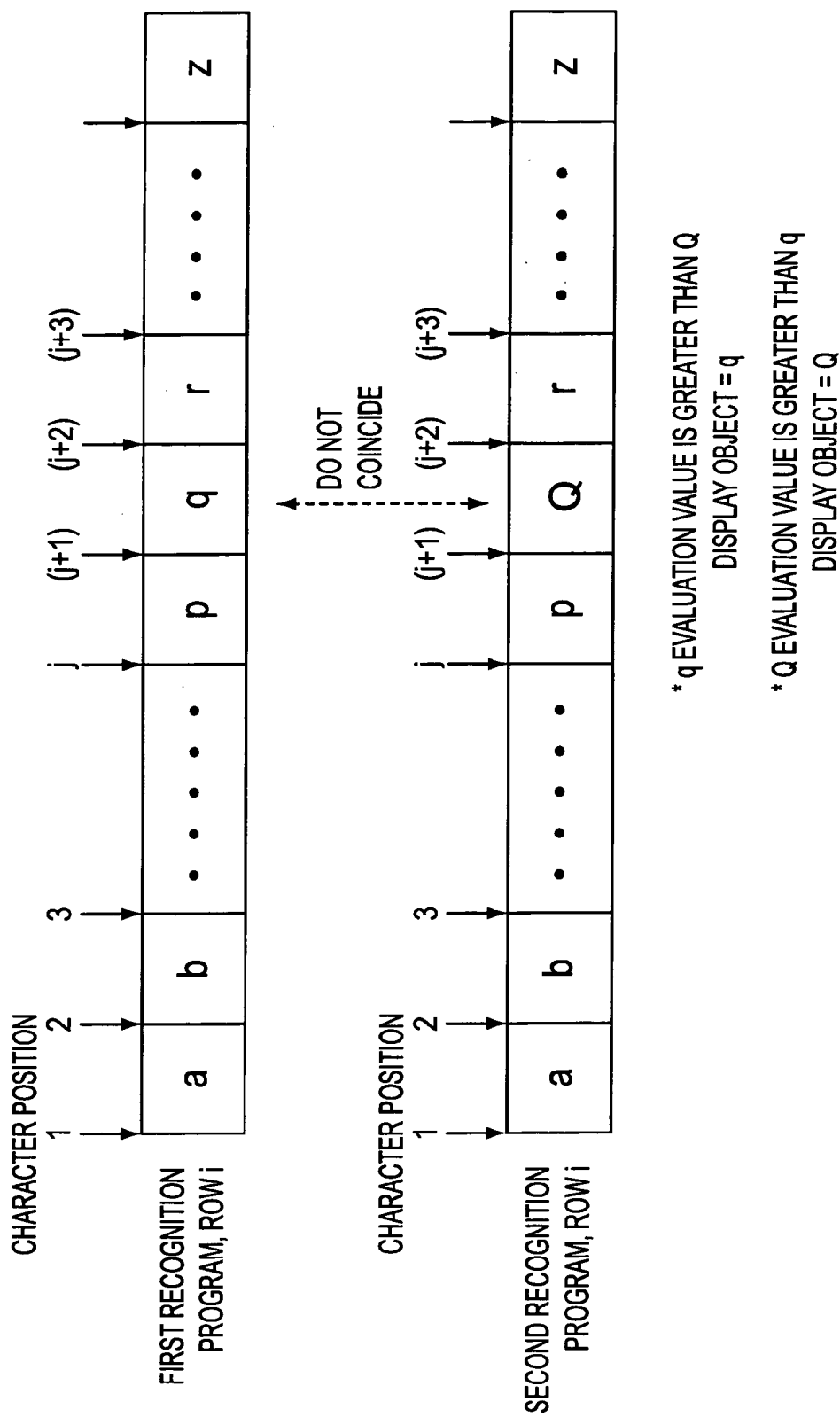
FIG. 8 is an explanatory diagram for the operation of the extraction program in accordance with embodiments of the present invention.

As shown in FIG. 8, in accordance with the present invention, when a character recognized by the first recognition program 12a and a character recognized by the second recognition program 15a do not coincide, the recognized character having a higher evaluation value of the two recognized characters is set for processing.

Next, in step ST15, the value of variable i is incremented, such that the next row is processed, and the operational process returns to step ST11.

When it is determined in step ST13 that $[x_{j1}=x_{j1}]$ has been established for all of the coordinates $x_{j1}$, $x_{j1}$ the operational process continues in step ST16 (FIG. 5). More specifically, when it is determined that the number of recognized characters in row i recognized using the first recognition program 12a is not the same as the number of the recognized characters in row i recognized by the second recognition program 15a, the operational process continues in step ST16 (flow chart shown in FIG. 5). However, it may happen coincidentally that the respective numbers of recognized characters are not related due to a ± relation. The two image data positions that contain the unequal image data positions are specified ($x_{j1}=x_{j1}$ is established at this image data position).

For example, the Chinese character "become" is erroneously read as two characters: the "i" and the "hi" in the Japanese katakana syllabary. The two characters consisting of the katakana "no" and the katakana "re" are erroneously read as one character "ru". Therefore, it occurs that the number of recognized characters in row i recognized by the first recognition program 12a is not the same as the number of recognized characters in row i recognized by the second recognition program 15a.

Figure 9:
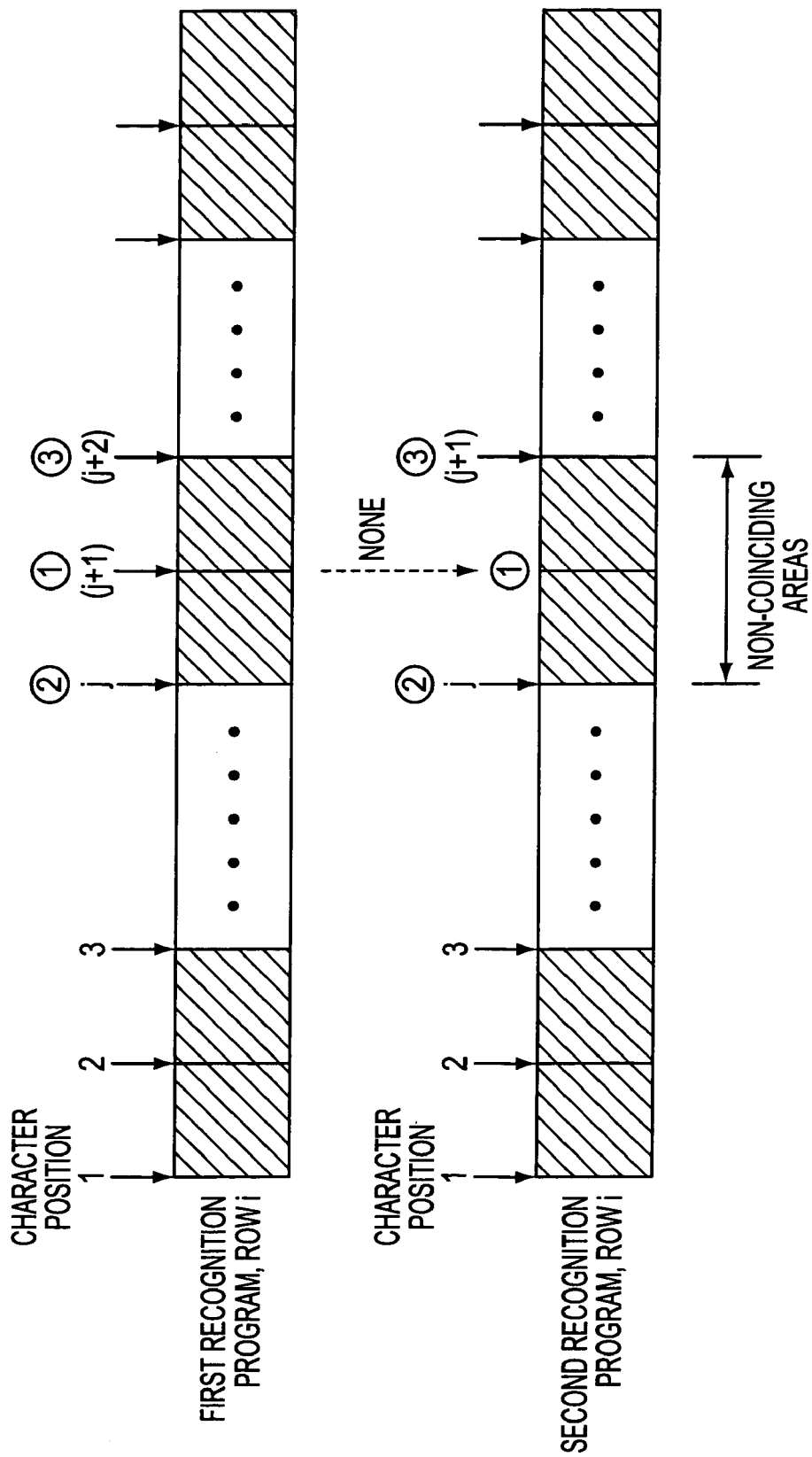
FIG. 9 is an explanatory diagram for the operation of the extraction program in accordance with embodiments of the present invention.

As shown in FIG. 9, when the number of characters in a row i recognized by the respective recognition programs 12a, 15a is different, there are image data positions (① in FIG. 9) for which $[x_{j1}=x_{j1}]$ is not established. Thus, two image data positions (② and ③ in FIG. 9) that comprise the image data position are specified. $[x_{j1}=x_{j1}]$ is established at these two image data positions.

Next, in step ST17, the recognized characters that are located between the specified image data positions are determined not to coincide and, at the same time, the recognized characters with a large number of characters are set to be displayed. For example, the first recognition program 12a recognizes the Japanese katakana syllabary characters "no" and "re" as characters whose locations do not coincide. When the second recognition program 15a has recognized these characters as "ru," "no" and "re" are set for display.

Alternatively, in accordance with embodiments of the present invention, the recognized characters with a large number of characters are not candidates for display, and a method may be adopted that sets the recognized characters with a small number of characters for display. For example, when the first recognition program 12a recognizes katakana characters "no" and "ru" as characters whose locations do not coincide, and the second recognition program 15a recognizes this as katakana character "ru," a method may be adopted that sets "ru" for display.

The size of a single character is also estimated from the list of coordinates $[x_{j1}, x_{j1}]$ of the left upper ranking coordinate in each of the character areas of row i. The number of characters in the recognized characters whose locations do not coincide is determined from the estimated size of the character. Based on this, a method may be used wherein either the recognized characters whose locations do not coincide but are recognized by the first recognition program 12a or the recognized characters whose locations do not coincide but are recognized by the second recognition program 15a are selected and set for display. When this method is used, the processing is somewhat complicated; however, characters with a high possibility of recognition, that is, the characters that are the least ambiguous, can be set for display.

In any event, in step ST17, processing is performed whereby either the recognized characters whose locations do not coincide but are recognized by the first recognition program 12a or the recognized characters whose locations do not coincide but are recognized by the second recognition program 15a are selected and set for display.

Next, in step ST18, the character positions for the recognized characters that do not coincide are detected from the recognized characters with equal image data positions. At the same time, the evaluation values of the two recognized characters that do not coincide are compared, and the recognized characters with the higher evaluation value are set for display.

In accordance with embodiments of the present invention, there are recognized characters coordinated to the same image data position for locations other than the non-coinciding locations that were detected in step ST16. As a result, the recognized characters are detected as coinciding or not coinciding. The recognized characters with a high evaluation value are set for display for the recognized characters that do not coincide.

Next, in step ST19, the value of variable i is incremented, which sets the next row for processing, the operational process returns to step ST11 and the processing in step ST11 through step ST19 is repeated.

When it is determined in step ST11 that the variable i exceeds the maximum value i max (shown in FIG. 7A) of the row number, the operational process continues in step ST20 of FIG. 4. The coinciding recognized characters which are to be displayed, the extracted non-coinciding locations, the recognized characters to be displayed at the non-coinciding locations and the image data positions of the recognized characters to be displayed, and which have been specified by the above processing, are all stored in the output file 19. At the same time, the recognized characters in the non-coinciding locations, as well as the recognition candidate characters and their evaluation value, are read. The read values are stored in the output file 19 and the extraction operational process is completed.

The processing performed by the output program 20a will now be described below with reference to the flow chart shown in FIG. 6.

When the output program 20a is activated by storing the recognition results data stored in the output file 19 according to the processing by extraction program 18a, the image data for the text images to be displayed are first read from the input file 11 in step ST31. Next, in step ST32, the image data read from the input file 11 are displayed in a window on the left-hand side of the display screen in terminal 3a.

Continuing, in step ST33, the recognition results data for the text images to be displayed are read from the output file 19. In step ST34, the recognized characters at the coinciding locations for the recognition results data read are specified and the recognized characters with non-coinciding locations for which the recognition results data have been specified are displayed on a window located on the right hand side of the display screen using different display formats. At the same time, the cursor is displayed on the window on the right hand side of the display.

Next, in step ST35, the image data positions of the recognition characters indicated by the cursor are obtained according to the recognition results data read in step ST33. The position corresponding to a left-hand window specified by the image data position is designated clearly and the processing is completed.

FIG. 10 illustrates an example of the display screen on which the output of the output program 20a is displayed in accordance with embodiments of the present invention.

As shown in FIG. 10, the Chinese character "ki" ["opportunity"] which is shown in (1) has different recognition results for the first recognition program 12a and the second recognition program 15a. Display is made by setting the Chinese character "ki" which is to be displayed and which is a recognized character with a high evaluation value according to the processing in step ST14 in the flow chart shown in FIG. 4.

The following situation is supposed. The Chinese character "ka" ["become"] indicated in (2) has different recognition results for the first recognition program 12a and the second recognition program 15a. The katakana characters "i" and "hi," which are recognized characters with a large number of characters are set for display according to the processing step ST17 of the flow chart shown in FIG. 5.

The following situation is also supposed. When the cursor indicated by the [▲] is displayed for the Chinese character "bun" ["writing"], indicated in (3), the [Δ], indicating that it is a position in the image data denoted by the cursor, is displayed at a position that corresponds to the image data of the text image displayed on the window on the left-hand side.

Although not shown in the FIG. 10, output program 20a makes it possible to clearly display both the recognized characters whose recognition results are the same in the first recognition program 12a and the second recognition program 15a and the non-coinciding recognized characters displayed in (1) and (2) by using different display format with different colors and the like. It is also possible to use a configuration that makes it possible to change the display format in order to indicate that these are both recognized characters indicated in (1) and erroneously read characters that have different types of recognized characters, which are displayed in (2).

In accordance with embodiments of the invention, the recognized characters displayed in (1) are erroneously read characters that coincide with respect to the number of characters in the row using the first recognition program 12a and the second recognition program 15a. The recognized characters indicated in (2) are recognized characters that have different numbers of characters inside the row using the first recognition program 12a and the second recognition program 15a. As a result, in accordance with the present invention, a configuration can also be used whereby it is possible to vary the display format for the recognized characters indicated in (1) and the recognized characters indicated in (2) so that this is clearly understandable.

Thus, the output program 20a operates as follows. When the user clicks on the recognized characters displayed in (1) and (2), the non-coinciding locations for the recognized characters, the recognized characters and the recognition candidate characters are sorted in ascending evaluation value order from the recognized characters and the recognition candidate characters at the non-coinciding locations, and their evaluation values read from output file 19 and the recognized characters (recognition candidate characters) are processed so that they are successively displayed in sorted order.

In the event that it is not possible to display the original characters, even in the selective processing using the above-described type of display, processing as described below is performed. The output program 20a links up with an editor (not shown in the drawing), responds to the character input from the user and the erroneously read characters are substituted for the original characters.

Figure 11:
FIG. 11 is an explanatory diagram for the operation of the output program in accordance with embodiments of the present invention.

In the embodiment of the invention shown in FIG. 10, the output program 20a displays one of the characters recognized for the locations that have different recognition results using the first recognition program 12a and the second recognition program 15a. However, as shown in FIG. 11, a type of processing may be carried out whereby symbols (or blanks) are clearly displayed instead of displaying the recognized characters.

The present invention has been described above with respect to the embodiments shown in the drawings. However, the present invention is not limited to the embodiments described above and illustrated in the drawings, and various modifications are possible.

For example, when the recognition results coincide but the evaluation value is low for either one or both of the recognition results using the first recognition program 12a and the second recognition program 15a, a determination is made whether the reliability of the recognition characters in the recognition results is low or not. Attention must be paid by the user since a display is made using the display format different from the recognized characters that have a high degree of reliability.

Further, for example, the display may be used as an output device. However, in accordance with the present invention, a printer or the like can be used as an output device. When output is made to a printer, the output can be made so that the non-coinciding characters are readily understandable by varying the style of the character, font or the like.

Moreover, in accordance with embodiments of the present invention described above, a determination of whether the characters recognized by the first recognition program 12a and the second recognition program 15a coincide or not can be made using the image data position of the recognized characters. However, it is also possible to use another method that does not use the image data position for the recognized characters, such as determining whether the recognized characters coincide by checking the list of the recognized character columns.

In accordance with embodiments of the present invention described above, two recognition programs are used, specifically, the first recognition program 12a and the second recognition program 15a. However, the present invention may also use three or more recognition programs to perform character recognition on the input text.

Embodiments of the present invention can be used to recognize various characters, without regard to the type of characters used. For example, the invention is not restricted to the recognition of typewritten characters, and the present invention may also be used to recognize handwritten characters as well.

As described hereinabove, the character recognition device in accordance with embodiments of the present invention uses a plurality of functions provided in separate character recognition methods when characters in the text image are recognized so that the text images that are read by an image scanner can be processed. The non-coinciding locations of the recognition results for these recognition functions are extracted, the non-coinciding locations are designated and the recognition results of the characters are output. Therefore, the user can immediately see which of the characters in the recognition results is erroneous so that the erroneously read characters can be checked.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A character recognition device to recognize characters in a captured text image, comprising:
   a first recognition unit to recognize the characters in the text image using a first character recognition algorithm;
   a second recognition unit to recognize the characters in the text image using a second character recognition algorithm different from the first character recognition algorithm, where each character recognition algorithm produces a first and a second character recognition result, respectively, including recognized characters from the same text image;
   an extraction unit to extract a location from the different algorithm first and second character recognition results where character recognitions from the different algorithm first and second character recognition results do not coincide with each other,
      wherein if the extracted non-coinciding location has a different number of recognized characters, to output at the extracted non-coinciding location recognized characters based upon either the first character recognition result or the second character recognition result according to a prescribed standard, and
      wherein if the extracted non-coinciding location has a same number of recognized characters, to output at the extracted non-coinciding location recognized characters with a higher evaluation value according to the first and second character recognition results; and
   an output unit to output the recognized characters while designating the extracted non-coinciding location of the non-coinciding character recognitions by the first and second character recognition algorithms.

2. A character recognition device as recited in claim 1, wherein the output unit contrasts the text image and the recognized characters.

3. A character recognition device as recited in claim 1, further comprising:
   a display having a display screen to display the recognized characters,
   wherein the output unit contrasts the text image and the recognized characters while displaying the recognized characters on the display screen, and displays a cursor in a display area of the recognized characters while displaying the text image in a format that designates a location of the text image coordinated at the position of the cursor.

4. A character recognition device as recited in claim 1, wherein the output unit further displays a symbol or a blank to designate the extracted non-coinciding location of the non-coinciding character recognitions by the first and second character recognition algorithms.

5. A character recognition device as recited in claim 1, wherein if the recognized characters with the higher evaluation value are output for the extracted non-coinciding location that has the same number of recognized characters, the output unit further outputs the higher evaluation value recognized characters in an output format different from an output format of another non-coinciding location that has a different number of recognized characters.

6. A character recognition device as recited in claim 1, wherein if the recognized characters selected using the prescribed standard are output for the extracted non-coinciding location with the different number of recognized characters, the output unit further outputs the prescribed standard selected recognized characters in a format different from an output format for a non-coinciding location.

7. A character recognition device as recited in claim 1, wherein the output unit further outputs the recognized characters in a format indicating that the different algorithm first and second character recognition results coincide but have a low recognition reliability.

8. A character recognition method to recognize characters in a captured text image, comprising:
   recognizing characters in the text image using a first character recognition algorithm;
   recognizing characters in the text image using a second character recognition algorithm different from the prescribed character recognition algorithm, where each character recognition algorithm produces a first and a second character recognition result, respectively, including recognized characters from the same text image;
   extracting a location from the different algorithm first and second character recognition results where character recognitions from the different algorithm first and second character recognition results do not coincide with each other,
      wherein if the extracted non-coinciding location has a different number of recognized characters, to output at the extracted non-coinciding location recognized characters based upon either the first character recognition result or the second character recognition result according to a prescribed standard, and
      wherein if the extracted non-coinciding location has a same number of recognized characters, to output at the extracted non-coinciding location recognized characters with a higher evaluation value according to the first and second character recognition results; and
   outputting the recognized characters while designating the extracted non-coinciding location of the non-coinciding character recognitions by the first and second character recognition algorithms.

9. A computer readable medium encoded with processing instructions for implementing a method of recognizing characters in a captured text image according to a process comprising:
   recognizing characters in the text image using a first character recognition algorithm;
   recognizing characters in the text image using a second character recognition algorithm different from the first character recognition algorithm, where each character recognition algorithm produces a first and a second character recognition result, respectively, including recognized characters from the same text image;
   extracting a location from the different algorithm first and second character recognition results where character recognitions from the first and second character recognition results do not coincide with each other,
      wherein if the extracted non-coinciding location has a different number of recognized characters, to output at the extracted non-coinciding location recognized characters based upon either the first character recognition result or the second character recognition result according to a prescribed standard, and wherein if the extracted non-coinciding location has a same number of recognized characters, to output at the extracted non-coinciding location recognized characters with a higher evaluation value according to the first and second character recognition results; and output the recognized characters while designating the extracted non-coinciding location of the non-coinciding character recognitions by the first and second character recognition algorithms.

10. An apparatus, comprising:

a plurality of different algorithm character recognizers to recognize characters in a same text and to output a plurality of respective character recognition results; and a programmed computer processor to control the apparatus according to a process comprising:

extracting a location from the plurality of character recognition results where character recognitions from the plurality of different algorithm character recognizers do not coincide with each other, wherein if the extracted non-coinciding location has a different number of recognized characters, to output at the extracted non-coinciding location recognized characters based upon one of the character recognition results according to a prescribed standard, and wherein if the extracted non-coinciding location has a same number of recognized characters, to output at the extracted non-coinciding location recognized characters with a higher evaluation value according to the plurality of character recognition results; and outputting the recognized characters while designating the extracted non-coinciding location of the non-coinciding character recognitions by the plurality of different algorithm character recognizers.

* * * * *